US008239827B2

(12) United States Patent
Sobel et al.

(10) Patent No.: US 8,239,827 B2
(45) Date of Patent: Aug. 7, 2012

(54) SYSTEM AND METHOD FOR PRIORITIZING THE COMPILATION OF BYTECODE MODULES DURING INSTALLATION OF A SOFTWARE APPLICATION

(75) Inventors: William E. Sobel, Jamul, CA (US); Sourabh Satish, Fremont, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1164 days.

(21) Appl. No.: 12/059,084

(22) Filed: Mar. 31, 2008

(65) Prior Publication Data
US 2009/0249313 A1 Oct. 1, 2009

(51) Int. Cl.
*G06F 9/44* (2006.01)
(52) U.S. Cl. ........ 717/118; 717/137; 717/140; 717/148; 717/174
(58) Field of Classification Search .................. 717/118, 717/137–148, 168–178
See application file for complete search history.

(56) References Cited

U.S. PATENT DOCUMENTS

| 5,848,274 | A |   | 12/1998 | Hamby |  |
|---|---|---|---|---|---|
| 6,139,199 | A | * | 10/2000 | Rodriguez | 717/159 |
| 6,678,888 | B1 | * | 1/2004 | Sakanishi | 717/172 |
| 7,213,240 | B2 |   | 5/2007 | Wong |  |
| 7,426,723 | B1 |   | 9/2008 | Nikolov |  |
| 7,644,395 | B1 |   | 1/2010 | Frey |  |
| 2003/0070161 | A1 | * | 4/2003 | Wong et al. | 717/148 |
| 2003/0093777 | A1 | * | 5/2003 | Bak et al. | 717/140 |
| 2004/0003266 | A1 | * | 1/2004 | Moshir et al. | 713/191 |
| 2005/0091651 | A1 | * | 4/2005 | Curtis et al. | 717/168 |
| 2006/0101450 | A1 | * | 5/2006 | Datta et al. | 717/168 |
| 2008/0127169 | A1 | * | 5/2008 | Malasky et al. | 717/174 |
| 2009/0113397 | A1 | * | 4/2009 | Wright, Sr. | 717/127 |
| 2009/0138292 | A1 | * | 5/2009 | Dusi et al. | 705/7 |

\* cited by examiner

*Primary Examiner* — Shahid Alam
*Assistant Examiner* — Tina Huynh
(74) *Attorney, Agent, or Firm* — Meyertons, Hood, Kivlin, Kowert & Goetzel, P.C.

(57) ABSTRACT

A system and method for compiling part of the bytecode for a software application into native code at install time when the software application is installed on a particular computer are described. According to one embodiment of the method, usage information for the software application may be received. The usage information may indicate how frequently or commonly each of a plurality of features of the software application is used. The usage information may be analyzed to determine a rank ordering of the features. The method may further comprise installing the software application on the particular computer. Installing the software application may comprise compiling one or more bytecode modules of the software application into native code, where the one or more bytecode modules are selected from a plurality of bytecode modules depending upon the rank ordering of the features.

15 Claims, 5 Drawing Sheets

SYSTEM AND METHOD FOR PRIORITIZING THE COMPILATION OF BYTECODE MODULES DURING INSTALLATION OF A SOFTWARE APPLICATION

BACKGROUND OF THE INVENTION

1. Field of the Invention

This invention relates generally to software applications that use bytecode which is compiled into native code before being executed. More particularly, the invention relates to a system and method for compiling part of the bytecode for a software application into native code at the time when the software application is installed on a computer system.

2. Description of the Related Art

Software developers typically create the source code for software applications in a high-level programming language by writing textual program statements that specify the application's functionality. The source code may then be compiled into executable machine code that can be executed by a physical processor. This executable machine code is also referred to as native code because it is formatted so that it executes on a specific type of processor using that processor's instruction set. Thus, native code is typically not portable across different types of computing devices, e.g., devices that use different types of processors.

In some programming environments the source code is not compiled directly into native code, but is instead compiled into an intermediate form of code called bytecode. Bytecode is a binary representation of program instructions suitable for execution on a specific type of virtual machine. The virtual machine itself may be implemented in software and may be executed by the processor of the physical computing device. A software application that has been compiled into bytecode instructions may be executed on the virtual machine, e.g., by the virtual machine dynamically interpreting the bytecode instructions.

An alternative technique for executing bytecode is to use just-in-time (JIT) compilation to dynamically compile the bytecode into native code during execution of the software application. For example, each method in the bytecode may have a stub function which engages the JIT compiler and replaces itself (the stub) with the generated native code which is then executed. One benefit of JIT compilation is that only the bytecode that is actually called gets compiled into native code, thus avoiding the use of time and resources to compile bytecode that is not used. However, the downside is the time and expense of JIT-compiling the code at runtime. This can introduce a noticeable lag as new code is executed for the first time. Further, in some execution environments the native code produced from JIT compilation is not cached across invocations of the software application, and thus the same bytecode may have to be re-compiled if it is called again when the software application is re-launched.

Instead of JIT-compiling the bytecode at runtime, some or all of the bytecode may be compiled into native code when the software application is installed on the computer system, e.g., as part of the installation procedure. The resulting native code may be cached and executed when needed during subsequent executions of the software application, thus avoiding the lag resulting from JIT compilation. Also, if the bytecode is compiled at install time, the compiler can compile larger sections of bytecode at the same time than would typically be compiled during execution of the software application, which can allow the compiler to make better optimizations and produce more efficient native code. However, the downside to compiling the bytecode at install time is the time required to do so. For large software applications or for low-powered devices, the compilation can be very time consuming, which can mean that a user has to wait longer for the software application to be installed.

SUMMARY

Various embodiments of a system and method for compiling part of the bytecode for a software application into native code at install time when the software application is installed on a particular computer are described herein. According to one embodiment of the method, usage information for the software application may be received. The usage information may indicate usage of a plurality of features of the software application. In some embodiments the usage information may indicate how frequently or commonly each of the plurality of features is used. The method may further comprise analyzing the usage information to determine a rank ordering of the features. For example, the features may be ordered so that the feature which is used most frequently or commonly is ranked highest, followed by the next most frequently or commonly used feature, and so on. The method may further comprise installing the software application on the particular computer. Installing the software application may comprise compiling one or more bytecode modules of the software application into native code, where the one or more bytecode modules are selected from a plurality of bytecode modules depending upon the rank ordering of the features.

BRIEF DESCRIPTION OF THE DRAWINGS

A better understanding of the invention can be obtained when the following detailed description is considered in conjunction with the following drawings, in which.

Figure 1:
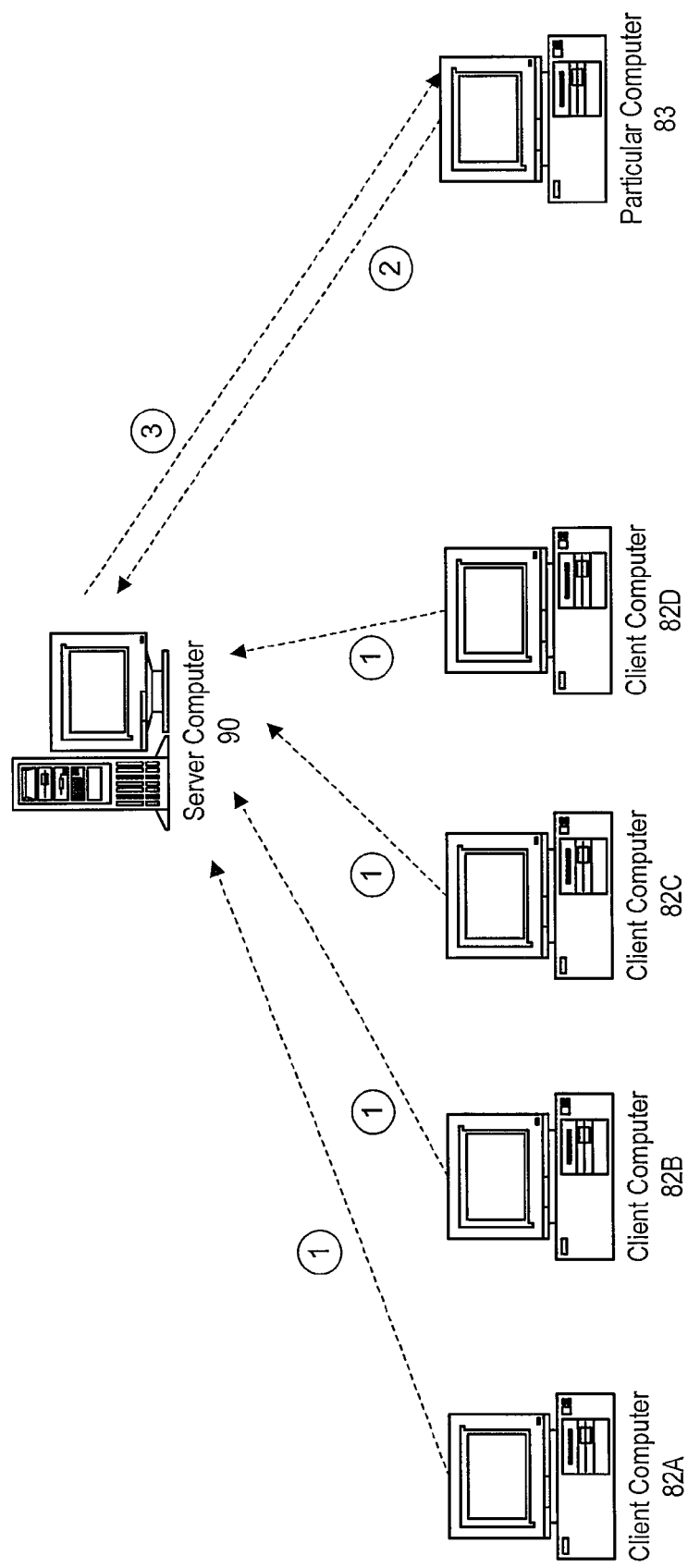
FIG. 1 illustrates an example of a system configured to implement a method for compiling selected bytecode modules of a software application into native code when the software application is installed on a particular computer.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a system and method for compiling part of the bytecode for a software application into native code at install time when the software application is installed on a computer system are described herein. The method may comprise receiving usage information for the software application, where the usage information indicates usage of a plurality of features of the software application. For example, the usage information may be created by tracking actual usage of the features when the software application is executed on one or more computers. The usage information may be analyzed to determine a rank ordering of the features. The method may further comprise installing the software application on a particular computer. During the installation of the software application, one or more bytecode modules of the software application may be compiled into native code, where the one or more bytecode modules are selected from a plurality of bytecode modules depending upon the rank ordering of the features.

For example, in some embodiments the features may be ordered according to how frequently or commonly they are used, as indicated by the usage information. In some embodiments the one or more bytecode modules may be selected as the bytecode modules which correspond to one or more of the most frequently used features, e.g., the bytecode modules that implement the most frequently used features. Compiling these particular bytecode modules during the installation of the software application may result in native code for the most frequently used features being created and cached for later use when the software application is subsequently executed on the particular computer. Thus, it will not be necessary to perform JIT compilation for these features during execution of the software application even when they are used for the first time since the native code for these features was already created and cached at install time. This means that the user will not experience the delay that the JIT compilation would typically cause.

The bytecode modules that are not compiled when the software application is installed may still need to be JIT compiled during execution of the software application, if they are accessed. However, since these bytecode modules may correspond to features of the software application which are used less frequently, it is possible that some of these bytecode modules may never need to be compiled at all, e.g., if the user never accesses certain features of the software application. Thus, the bytecode modules which are most likely to be needed, e.g., the bytecode modules that correspond to the most frequently or commonly used features of the software application, may be compiled at install time, which avoids the need to perform JIT compilation of these bytecode modules during execution of the software application. Bytecode modules which are less likely to be needed, e.g., bytecode modules that correspond to less frequently used features of the software application, may not be compiled at install time, thus shortening the amount of time required to install the software application so that the user does not have to wait as long for the software application to be installed.

Referring now to FIG. 1, an example of a system configured to implement an embodiment of the method discussed above is illustrated. In this example, the software application is already installed on a plurality of client computers, e.g., the client computers 82A-82D. The software application may be configured to track usage of a plurality of features of the software application. For example, the software application may track which of the features are actually used when the software application is executed and may produce usage information that indicates how frequently each of the plurality of features of the software application is actually used. For example, the software application may be instrumented with instrumentation code that detects when the features are invoked or used.

The software application on each client computer 82 may automatically transmit usage information to the server computer system 90, as indicated by the arrows 1. (The computers 82 are referred to herein as "client" computers 82 since they transmit usage information to the server computer system 90.) The respective usage information transmitted by each respective client computer 82 indicates how frequently each of the plurality of features of the software application is used on the respective client computer 82.

The server computer system 90 may analyze the usage information received from the client computers 82 in order to determine a rank ordering of the plurality of features. For example, the server computer system 90 may order the features so that the feature which is used most frequently or commonly across all of the client computers 82 is ranked highest, followed by the next most frequently or commonly used feature, and so on. In various embodiments the server computer system 90 may use any of various techniques to analyze the usage information. In some embodiments the server computer system 90 may aggregate the respective usage information received from the plurality of client computers 82 such that the aggregated usage information indicates how frequently each of the features is used across the plurality of client computers 82. The server computer system 90 may then automatically analyze the aggregated usage information to determine the rank ordering of the features according to their usage frequencies, e.g., where the most frequently or commonly used features are the features that are highest in the rank ordering.

The software application may subsequently be installed on a new computer, e.g., the particular computer 83. The software application may be implemented using a plurality of bytecode modules. The rank ordering of the features may be used to select a subset of the bytecode modules for compilation when the software application is installed on the particular computer 83.

In some embodiments an installation program for the software application may contact the server computer system 90 when the software application is installed on the particular computer 83, as indicated by the arrow 2. In response, the server computer system 90 may transmit installation information to the particular computer 83. The installation program may use the installation information to select which bytecode modules to compile during the installation of the software application.

In some embodiments the installation information may specify a particular subset of the plurality of bytecode modules that should be compiled during the installation of the software application. For example, after the server computer system 90 determines the rank ordering of the features, the server computer system 90 may automatically select one or more of the bytecode modules for install-time compilation, based on the rank ordering of the features.

As one simple example, the server computer system 90 may determine which bytecode modules correspond to the 10 most frequently used features of the software application, e.g., may determine which bytecode modules implement these 10 features of the software application. In some embodiments the server computer system 90 may utilize mapping information to determine which bytecode modules correspond to which features of the software application. In other embodiments the usage information which the server computer system 90 receives from the client computers 82 specify which bytecode module was invoked or used for each of the features that are tracked, and thus, the usage information itself may be used to correlate the bytecode modules with the corresponding features.

Once the server computer system 90 determines which bytecode modules correspond to the 10 (or whatever desired number) most frequently used features of the software application, the server computer system may then create installation information specifying that these particular bytecode modules should be compiled by the installation program during the installation of the software application.

As another example, the server computer system 90 may determine the total number of bytecode modules that compose the software application, and may select a particular percentage of them to be compiled at install time, where the ones to be compiled at install time are selected depending upon the rank ordering of the features. For example, suppose that the software application includes 200 bytecode modules. The server computer system 90 may order the bytecode modules according to the features to which they correspond, e.g., so that the one or more bytecode modules that implement the highest-ranked feature are first in the ordering, followed by the one or more bytecode modules that implement the next highest-ranked feature, and so on. The server computer system 90 may then select the 15% of the bytecode modules that are highest in the ordering as the ones to be compiled during the installation of the software application, e.g., in this example, may select the 30 bytecode modules that are highest in the ordering.

As another example, the server computer system 90 may compute an order for the bytecode modules based on the rank ordering of the features similarly as described above, but instead of selecting a percentage of them based on their total number, the server computer system 90 may select a percentage based on the total size of the bytecode modules. For example, suppose that the total size of all the bytecode modules is 100 MB, and suppose that the server computer system 90 is configured to select bytecode modules such that the size of the selected bytecode modules totals to 15% of the total size (15 MB in this example). The server computer system 90 may thus select the bytecode modules in the computed order, i.e., starting with the one or more bytecode modules that implement the highest-ranked feature, followed by the one or more bytecode modules that implement the next highest-ranked feature, and so on. The server computer system 90 may keep track of the sizes of the bytecode modules that have been selected and may stop selecting bytecode modules once a total size of 15 MB has been reached.

In another embodiment, the server computer system 90 may be configured to select bytecode modules so that the size of the selected bytecode modules sums to some particular size, say 25 MB, regardless of the total size of all the bytecode modules of the software application, e.g., regardless of whether 25 MB is 15% of the total size or 50% of the total size.

In another embodiment, the server computer system 90 may compare the actual usage of the features to particular usage criteria to decide whether or not particular bytecode modules should be compiled at installation time. For example, for each respective feature that is tracked, the server computer system 90 may determine whether the respective feature was used at least five times by at least 30% of the client computers 82. If so then the one or more bytecode modules that implement the respective feature may be selected for compilation during installation of the software application, or if not, then the one or more bytecode modules that implement the respective feature may be left for JIT compilation. These criteria are given as examples only, and in various embodiments the server computer system 90 may be configured to use any of various kinds of usage criteria or other criteria to decide whether or not particular bytecode modules should be compiled at installation time.

Thus, in some embodiments, the installation information that the installation program receives from the server computer system 90 may specify one or more particular bytecode modules that should be compiled during the installation of the software application. The installation program may compile these particular bytecode modules and leave the other bytecode modules for later JIT compilation.

In other embodiments the installation program may be configured to use a "time budget" when compiling the bytecode modules. For example, instead of specifying an exact subset of the bytecode modules to be compiled by the installation program, the installation information may just specify an order for the bytecode modules. As discussed above, the server computer system may have computed the order based on the rank ordering of the features, e.g., so that the one or more bytecode modules that implement the highest-ranked feature are first in the ordering, followed by the one or more bytecode modules that implement the next highest-ranked feature, and so on. The installation program may be configured to compile, in the order specified by the installation information, as many of the bytecode modules of the software application as possible before a particular amount of time expires. For example, the installation program may set a timer for 10 seconds. The installation program may then begin compiling the bytecode modules in the specified order, e.g., by first compiling the one or more bytecode modules that implement the highest-ranked feature, followed by the one or more bytecode modules that implement the second highest-ranked feature, and so on. Once the 10-second timer expires, the installation program may stop compiling bytecode modules. Thus, different numbers of bytecode modules may be compiled during installation of the software application on different respective computers, e.g., depending on the processor speed, amount of memory, and other resources available on the respective computers.

In other embodiments the installation program for the software application may not communicate with the server computer system 90 to receive the installation information, but instead the installation information may already be included in or packaged together with the installation program. For example, if the installation program is stored on a storage medium including one or more optical discs, then the installation information may also be stored on the one or more optical discs. However, by configuring the installation program to communicate with the server computer system 90 to receive the installation information at install time, the installation information may be able to change over time. For example, the installation information may be automatically updated over time as the server computer system 90 receives additional usage information from additional client computers 82.

In some embodiments the version of the software application that is installed on the particular computer 83 may be the same version that is being executed by the client computers 82. For example, after the software application has been released and has been in use for some time, a new user may purchase or download the software application and run the installation program. The installation program may thus make use of the usage information that has already been received from the other client computers 82 in order to determine which bytecode modules to compile during the installation of the software application on the particular computer 83. When the software application is subsequently executed on the particular computer 83, the feature usage may be tracked, and usage information indicating the feature usage for the software application on the particular computer 83 may be transmitted to the server computer system 90, so that it may contribute to determining which bytecode modules to compile when the software application is subsequently installed on other computers.

In other embodiments the version of the software application that is installed on the particular computer 83 may be a different version than the version of the software application that is being executed by the client computers 82. For example, the version of the software application that is installed on the particular computer 83 may be a later version. For example, suppose that a version 1.0 of the software application is installed on the client computers 82. A new version 2.0 of the software application may later be released. The features of the two versions of the software application may largely be the same. Thus, the usage information indicating which features are most frequently or commonly used in the version 1.0 of the software application may be very accurate in predicting which features will be most frequently or commonly used in the version 2.0 of the software application.

In some embodiments the plurality of features of the software application may have a default rank ordering. For example, instead of determining the rank ordering of the features based on the usage information, the default rank ordering of the features may be used until a threshold amount of usage information has been received or until usage information has been received from a threshold number of client computers 82. Once the threshold has been reached, the rank ordering of the features may be calculated based on the actual usage information instead of using the default rank ordering. In other embodiments, the rank ordering of the features may be calculated based on both the actual usage information and the default rank ordering. For example, the default rank ordering may be given more weight at first, but as more usage information is received, the usage information may be weighted more in determining the rank ordering.

In other embodiments the usage information received from the client computers 82 may be stored in a database that has been pre-seeded with default usage information. For example, the default usage information may have been stored in the database during internal testing of the software application. Thus, until a large database of actual usage information has been received from many client computers 82, the rank ordering of the features may be influenced by a default rank ordering of the features and/or by a database pre-seeded with default usage information. This may help to prevent the rank ordering of the features from being skewed to a rank ordering that is uncharacteristic of how the features are generally used across a large user base if the first client computers 82 to report usage information for some reason do not reflect average use of the features.

Figure 2:
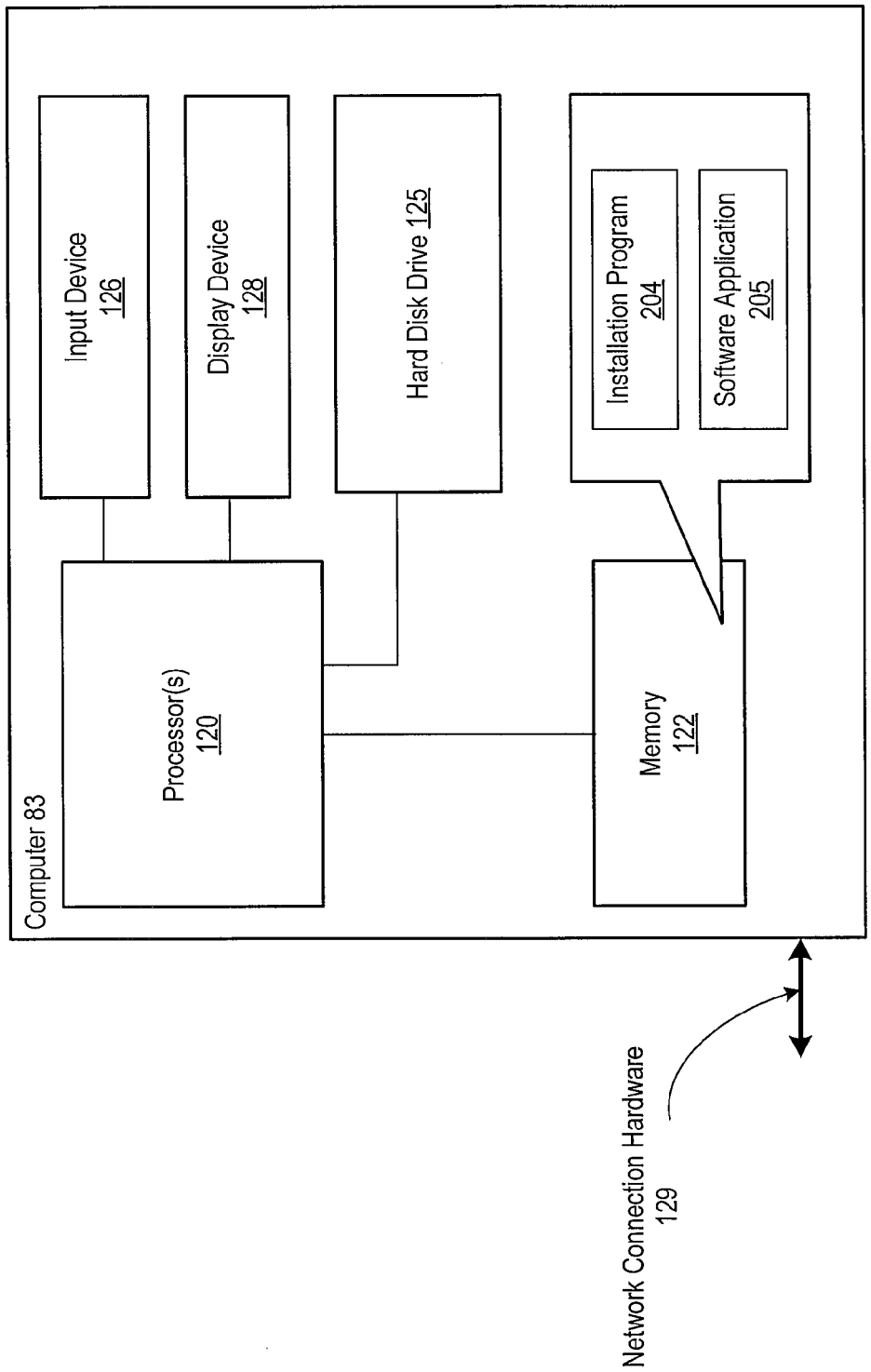
FIG. 2 illustrates one example of the particular computer on which the software application is installed.

It is noted that the client computers 82 and a particular computer 83 which execute the software application may be or may include any type of computers or computing devices. As examples, the client computers 82 and the particular computer 83 may be desktop PC's, mobile computing devices, or any of various other kinds of computing devices. FIG. 2 illustrates one example of the particular computer 83 on which the software application is installed and/or an example of a client computer 82. In this example, the computer 83 includes a processor 120 coupled to memory 122. In some embodiments, the memory 122 may include one or more forms of random access memory (RAM) such as dynamic RAM (DRAM) or synchronous DRAM (SDRAM). However, in other embodiments, the memory 122 may include any other type of memory instead or in addition.

The memory 122 may be configured to store program instructions and/or data. In particular, the memory 122 may store the installation program 204. The processor 120 may execute the installation program 204 to install the software application 205. The installation program 204 executes to compile (or invoke compilation of) the selected bytecode modules during the installation, as described above. During the installation of the software application 205, information associated with or used by the software application 205 may be persistently stored on the hard disk drive 125 or on another storage device of the computer 83. In particular, the native code produced by compiling the selected bytecode modules may be persistently stored in a cache on the hard disk drive 125. Code for the software application 205 may subsequently be loaded into the memory 122, as illustrated in FIG. 2, and may be executed by the processor 120.

The memory 122 may also store other software which operates in conjunction with or which is used by the installation program 204 and the software application 205, such as operating system software, file system software, network communication software, device management software, etc. In some embodiments the memory 122 may also store runtime environment software which manages the execution of the software application 205. For example, the runtime environment software may include a just-in-time (JIT) compiler which dynamically compiles bytecode modules that were not compiled when the software application 205 was installed, as they are needed.

In various embodiments the installation program 204 may be implemented in any of various ways and may have any desired software architecture. For example, in some embodiments the installation program 204 may be implemented as a single software program. In other embodiments the installation program 204 may be implemented as two or more software programs that operate in conjunction with each other.

Also, the software application 205 may be implemented in any of various ways, e.g., using any of various kinds of programming languages or development environments, and may have any desired software architecture. As described above, the software application 205 includes a plurality of bytecode modules. In various embodiments the bytecode modules may include any kind of bytecode, e.g., the bytecode may have been created by compiling any of various types of programming languages into a binary representation of program instructions corresponding to any of various types of virtual machines. For example, in some embodiments the bytecode may comprise Java bytecode, e.g., bytecode for a Java Virtual Machine (a virtual machine constructed in accordance with a published Java Virtual Machine specification). As another example, in some embodiments the bytecode may comprise Microsoft Intermediate Lanaguage (MSIL) code or bytecode for a Common Language Runtime (CLR) virtual machine, such as for a Microsoft.NET software application.

In various embodiments the bytecode modules used by the software application 205 may be constructed or packaged as any kinds of modules or units of bytecode, e.g., depending upon the type of development environment or programming language used to create the software application 205. In general, the bytecode modules may be any kind of modules or units of bytecode that can be compiled separately from other modules or units of bytecode. As one example, if the software application 205 is a Microsoft.NET software application then the bytecode modules may include .NET assemblies. As another example, if the software application 205 is a Java application then the bytecode modules may include Java classes or beans.

In various embodiments the software application 205 may be executable to perform any of various functions or applications. A few examples include applications related to word processing, spreadsheets, network communication, financial applications, games, device management, data processing, etc. The software application 205 may include any of various kinds of features, e.g., depending on the type of software application, and may include code for tracking and reporting the usage of any of its features.

Referring again to FIG. 2, it is noted that the processor 120 is representative of any type of processor. For example, in some embodiments, the processor 120 may be compatible with the x86 architecture, while in other embodiments the processor 120 may be compatible with the SPARC™ family of processors. Also, in some embodiments the computer 83 may include multiple processors 120.

The computer 83 may also include one or more input devices 126 for receiving user input from a user of the computer system 83. The input device(s) 126 may include any of various types of input devices, such as keyboards, keypads, microphones, or pointing devices (e.g., a mouse or trackball). The computer 83 may also include one or more output devices 128 for displaying output to the user. The output device(s) 128 may include any of various types of output devices or display devices, such as LCD screens or monitors, CRT monitors, etc.

The computer 83 may also include network connection hardware 129 through which the computer 83 connects to a network, e.g., in order to transmit usage information for the software application 205 to the server computer system 90. The network connection hardware 129 may include any type of hardware for coupling the computer 83 to the network, e.g., depending on the type of network. In various embodiments, the computer 83 may connect to the server computer system 90 through any type of network or combination of networks. For example, the network may include any type or combination of local area network (LAN), a wide area network (WAN), wireless networks, an Intranet, the Internet, etc. Exemplary local area networks include Ethernet networks, Fiber Distributed Data Interface (FDDI) networks, and token ring networks. Also, the computer 83 and the server computer system 90 may each be coupled to the network using any type of wired or wireless connection medium. For example, wired mediums may include Ethernet, fiber channel, a modem connected to plain old telephone service (POTS), etc. Wireless connection mediums may include a wireless connection using a wireless communication protocol such as IEEE 802.11 (wireless Ethernet), a modem link through a cellular service, a satellite link, etc.

Figure 3:
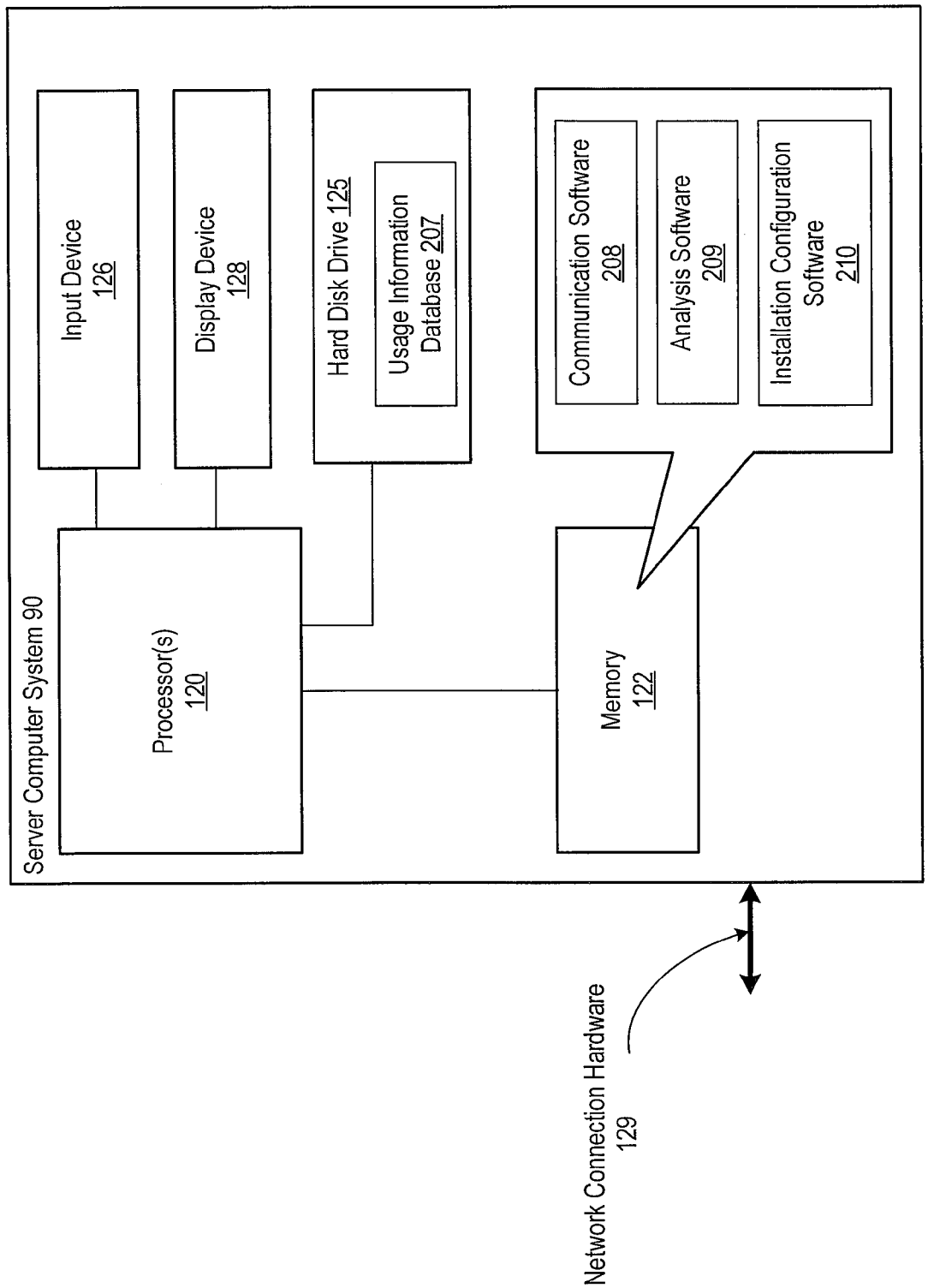
FIG. 3 illustrates one embodiment of a server computer system.

The server computer system 90 may also include any type of computers or computing devices. FIG. 3 illustrates one embodiment of the server computer system 90. The server computer system 90 may include one or more processors 120 and memory 122. The memory 122 may include software program instructions executable by the one or more processors 120 to implement the method illustrated in a flowchart of FIG. 4.

Figure 4:
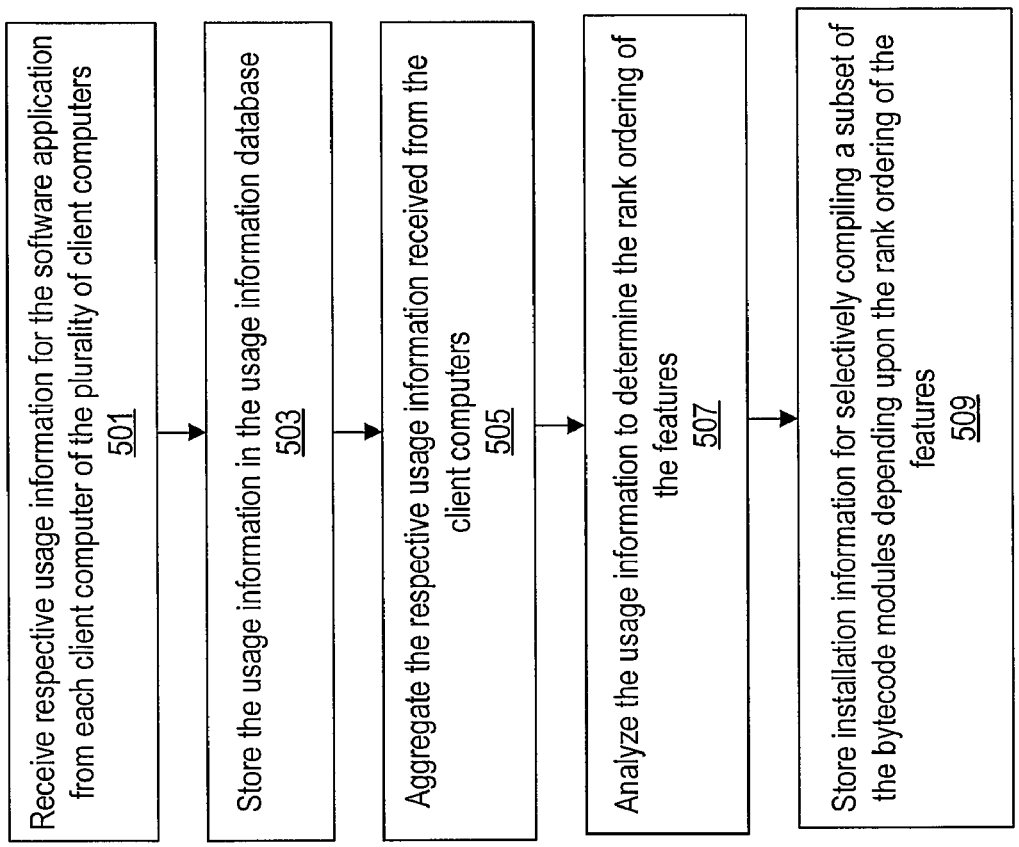
FIG. 4 is a flowchart diagram illustrating one embodiment of a method implemented by the server computer system.

For example, the memory 122 may include communication software 208 which executes to receive the respective usage information for the software application from each client computer of the plurality of client computers 82 and store the usage information in a usage information database 207, as indicated in blocks 501 and 503 of FIG. 4. The usage information database 207 may be stored on one or more hard disk drives 125 or other storage devices of the server computer system 90.

The memory 122 may also include analysis software 209 which executes to aggregate the respective usage information received from the client computers and analyze the aggregated usage information to determine the rank ordering of the features, as indicated in blocks 505 and 507 of FIG. 4. In other embodiments the communication software 208 may continually aggregate the usage information received from the various client computers 82 as it is received.

The memory 122 may also include installation configuration software 210 which executes to store installation information for selectively compiling a subset of the bytecode modules depending upon the rank ordering of the features. For example, as described above, the installation information may specify a particular subset of bytecode modules that should be compiled when the software application 205 is installed. The particular subset of bytecode modules may be selected based on the rank ordering of the features. The installation information may also, or may instead, specify a compilation order for the bytecode modules of the software application 205, where the compilation order is defined by the rank ordering of the features.

In some embodiments the server computer system 90 may include multiple computers. Thus, different functions described herein as being performed by the server computer system 90 may be performed by different computers included in the server computer system 90. For example, the server computer system 90 may include one or more computers that perform the functions described above with respect to the communication software 208, which receives and stores the usage information in the usage information database 207. A different one or more computers may perform the functions of the analysis software 209, which analyzes the usage information to determine the rank ordering of the features. A different one or more computers may perform the functions of the installation configuration software 210, which creates and stores the installation information based on the rank ordering of the features.

As discussed above, in some embodiments of the method, usage information received from a plurality of client computers 82 may be used to determine a particular subset of bytecode modules to compile when installing the software application 205 on a particular computer 83.

Figure 5:
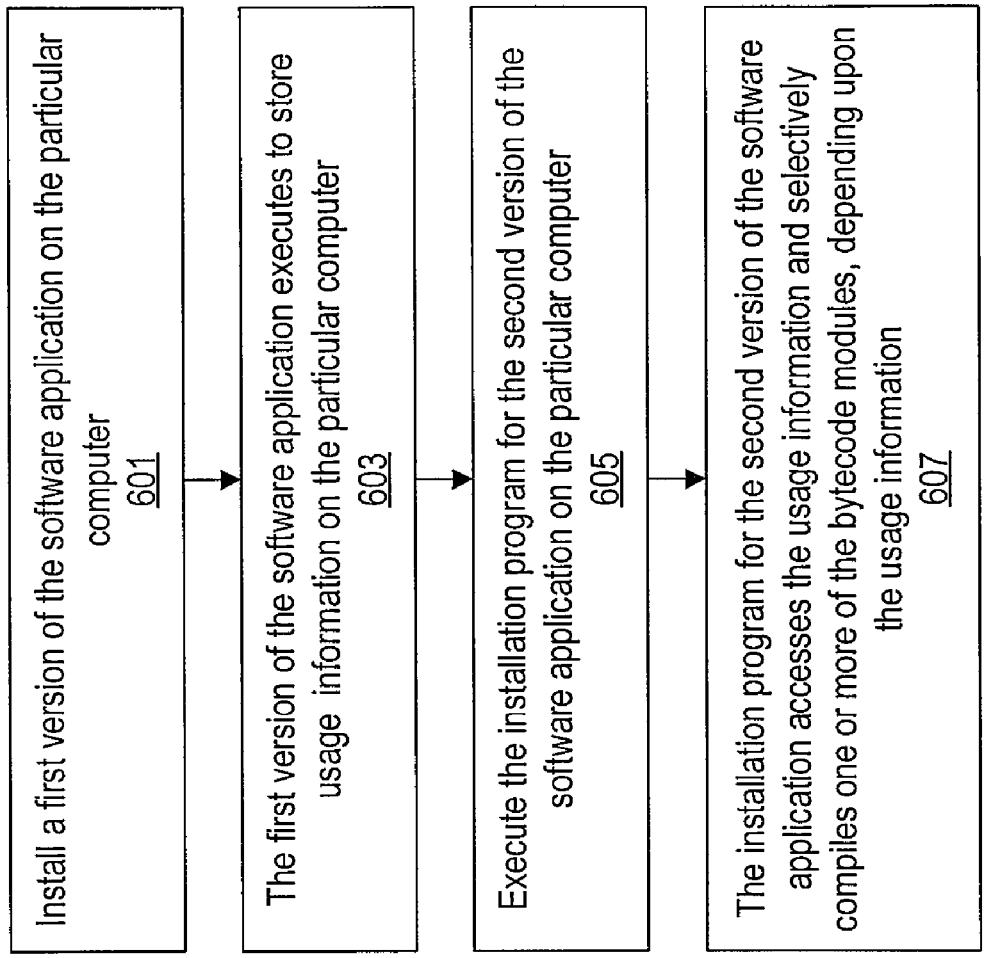
FIG. 5 is a flowchart diagram illustrating one particular embodiment of the method for installing the software application on the particular computer.

FIG. 5 is a flowchart diagram illustrating an alternative embodiment of the method. As indicated in block 601, a first version of the software application may be installed on the particular computer 83. For example, an installation program for the first version of the software application may install the first version of the software application on the particular computer 83. The user may then execute the first version of the software application. As the user interacts with the first version of the software application, the first version of the software application may keep track of which features the user uses and how frequently he uses each feature. However, instead of or in addition to transmitting the usage information to the server computer system 90, the first version of the software application may store the usage information locally on the particular computer 83, as indicated in block 603. For example, the first version of the software application may persistently store the usage information on a hard disk drive 125 or other storage device of the particular computer 83.

As indicated in block 605, an installation program for a second version of the software application may later be executed on the particular computer 83, e.g., in order to upgrade the software application to the second version. As indicated in block 607, the installation program for the second version of the software application may access the usage information that was stored locally by the first version of the software application, and may selectively compile one or more of the bytecode modules, depending upon the usage information. For example, the installation program for the second version of the software application may analyze the usage information to determine a rank ordering of the features of the software application as they are used by the user of the particular computer 83. The installation program for the second version of the software application may select the one or more bytecode modules to compile during the installation depending upon the rank ordering of the features, e.g., using techniques such as those described above.

Thus, in the embodiment of the method illustrated in FIG. 5, the selection of the bytecode modules to compile during installation of the software application on the particular computer 83 may depend on how the features of the software application are used on the particular computer 83, e.g., based on usage information from a prior version of the software application. This may enable different bytecode modules to be selected for compilation when the software application is installed on different computers, e.g., depending upon how the features of the software application are actually used on each computer. In other embodiments the selection of the bytecode modules to compile during the installation of the software application may be based on both the local usage information and the aggregated usage information reported by the other client computers 82. For example, the selection of which bytecode modules to compile may be weighted to primarily take into account the local usage information, but may also take into account the aggregated usage information, or vice versa.

It is noted that various embodiments may further include receiving, sending or storing instructions and/or data implemented in accordance with the foregoing description upon a computer-accessible storage medium. Generally speaking, a computer-accessible storage medium may include any storage media accessible by a computer during use to provide instructions and/or data to the computer. For example, a computer-accessible storage medium may include storage media such as magnetic or optical media, e.g., one or more disks (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer may access the storage media via a communication means such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
receiving usage information for a software application, wherein the usage information indicates a respective usage frequency for each respective feature of a plurality of features of the software application, wherein the software application includes a plurality of bytecode modules;
analyzing the usage information to determine a rank ordering of the features, wherein the rank ordering ranks the features according to their respective usage frequencies;
selecting a first one or more of the bytecode modules to be compiled into native code during an installation of the software application on a particular computer, wherein a second one or more of the bytecode modules are not selected to be compiled during the installation, wherein the first one or more bytecode modules are selected depending upon the rank ordering of the features; and
installing the software application on the particular computer, wherein installing the software application comprises installing each of the first one or more bytecode modules, wherein installing each of the first one or more bytecode modules comprises compiling each of the first one or more bytecode modules into native code, and wherein installing the software application further comprises installing each of the second one or more bytecode modules without compiling any of the second one or more bytecode modules into native code.

2. The method of claim 1,
wherein analyzing the usage information to determine the rank ordering of the features comprises automatically analyzing the usage information and automatically determining the rank ordering of the features.

3. The method of claim 1,
wherein receiving the usage information for the software application comprises a server computer receiving respective usage information for the software application from each client computer of a plurality of client computers, wherein the respective usage information received from each respective client computer indicates how frequently each of the features is used on the respective client computer.

4. The method of claim 3, further comprising:
creating aggregated usage information from the respective usage information received from the plurality of client computers, wherein the aggregated usage information indicates how frequently each of the features is used across the plurality of client computers;
wherein analyzing the usage information comprises analyzing the aggregated usage information.

5. The method of claim 3,
wherein each of the client computers has a first version of the software application installed;
wherein the respective usage information received from each respective client computer indicates how frequently each of the features is used during execution of the first version of the software application on the respective client computer;
wherein installing the software application on the particular computer comprises installing a second version of the software application on the particular computer.

6. The method of claim 1,
wherein the usage information is stored on the particular computer by a first version of the software application, wherein the usage information indicates how frequently each of the features is used on the particular computer;
wherein receiving the usage information comprises an installation program for a second version of the software application receiving the usage information;
wherein installing the software application on the particular computer comprises the installation program installing the second version of the software application on the particular computer.

7. The method of claim 1, further comprising:
determining an order for the first one or more bytecode modules based on the rank ordering of the features;
wherein the first one or more bytecode modules are compiled in the determined order.

8. The method of claim 7,
wherein each of the first one or more bytecode modules corresponds to one of the plurality of features, wherein determining the order for the first one or more bytecode modules comprises ordering the first one or more bytecode modules by the rank ordering of the features to which the first one or more bytecode modules correspond.

9. The method of claim 1,
wherein the method further comprises determining an order for the plurality of bytecode modules, wherein the order is defined by the rank ordering of the features;
wherein the first one or more bytecode modules that are compiled into native code are selected as the first N bytecode modules based on the determined order for the plurality of bytecode modules, wherein N is an integer.

10. The method of claim 1, further comprising:
determining an order for the plurality of bytecode modules, wherein the order is defined by the rank ordering of the features;
wherein installing the software application on the particular computer comprises compiling, in the determined order, as many of the plurality of bytecode modules as possible before a particular amount of time expires;
wherein the first one or more bytecode modules are compiled before the particular amount of time expires.

11. A non-transitory computer-accessible storage medium storing program instructions executable to:
receive usage information for a software application, wherein the usage information indicates a respective usage frequency for each respective feature of a plurality of features of the software application, wherein the software application includes a plurality of bytecode modules;
analyze the usage information to determine a rank ordering of the features, wherein the rank ordering ranks the features according to their respective usage frequencies;
select a first one or more of the bytecode modules to be compiled into native code during an installation of the software application on a particular computer, wherein a second one or more of the bytecode modules are not selected to be compiled during the installation, wherein the first one or more bytecode modules are selected depending upon the rank ordering of the features; and
install the software application on the particular computer, wherein installing the software application comprises installing each of the first one or more bytecode modules, wherein installing each of the first one or more bytecode modules comprises compiling each of the first one or more bytecode modules into native code, and wherein installing the software application further comprises installing each of the second one or more bytecode modules without compiling any of the second one or more bytecode modules into native code.

12. The non-transitory computer-accessible storage medium of claim 11, wherein the program instructions are further executable to:
determine an order for the first one or more bytecode modules based on the rank ordering of the features;
wherein the first one or more bytecode modules are compiled in the determined order.

13. The non-transitory computer-accessible storage medium of claim 12,
wherein each of the first one or more bytecode modules corresponds to one of the plurality of features, wherein determining the order for the first one or more bytecode modules comprises ordering the first one or more bytecode modules by the rank ordering of the features to which the first one or more bytecode modules correspond.

14. The non-transitory computer-accessible storage medium of claim 11, wherein the program instructions are further executable to:
determine an order for the plurality of bytecode modules, wherein the order is defined by the rank ordering of the features;
wherein installing the software application on the particular computer comprises compiling, in the determined order, as many of the plurality of bytecode modules as possible before a particular amount of time expires;
wherein the first one or more bytecode modules are compiled before the particular amount of time expires.

15. A system comprising:
one or more processors; and
memory storing program instructions;
wherein the program instructions are executable by the one or more processors to implement:
receiving usage information for a software application, wherein the usage information indicates a respective usage frequency for each respective feature of a plurality of features of the software application, wherein the software application includes a plurality of bytecode modules;
analyzing the usage information to determine a rank ordering of the features, wherein the rank ordering ranks the features according to their respective usage frequencies;
selecting a first one or more of the bytecode modules to be compiled into native code during an installation of the software application on a particular computer, wherein a second one or more of the bytecode modules are not selected to be compiled during the installation, wherein the first one or more bytecode modules are selected depending upon the rank ordering of the features; and
installing the software application on the particular computer, wherein installing the software application comprises installing each of the first one or more bytecode modules, wherein installing each of the first one or more bytecode modules comprises compiling each of the first one or more bytecode modules into native code, and wherein installing the software application further comprises installing each of the second one or more bytecode modules without compiling any of the second one or more bytecode modules into native code.

* * * * *